United States Patent [19]

Ratell, Jr

[11] Patent Number: 5,104,044
[45] Date of Patent: Apr. 14, 1992

[54] HIGH SPEED SCOURING HYDROACTUATED SPINNER FOR CAR WASH EQUIPMENT AND THE LIKE

[76] Inventor: Raymond E. Ratell, Jr, 3576 N. Park Ave., Warren, Ohio 44481

[21] Appl. No.: 596,333

[22] Filed: Oct. 12, 1990

[51] Int. Cl.⁵ .................................................. B05B 3/04
[52] U.S. Cl. .................................. 239/240; 239/237; 239/259; 239/261; 239/263
[58] Field of Search .............. 239/237, 240, 251, 259, 239/261, 263, DIG. 13; 134/179

[56] References Cited

U.S. PATENT DOCUMENTS

| | | | |
|---|---|---|---|
| 457,099 | 8/1891 | Woolsey | 239/251 X |
| 2,969,188 | 1/1961 | Guigues et al. | 239/263 X |
| 2,983,452 | 5/1961 | Lindbloom | 239/261 X |
| 3,409,030 | 11/1968 | Schmidt | 239/261 X |
| 3,431,580 | 3/1969 | Cirino et al. | |
| 3,447,505 | 6/1969 | Wagner | |
| 3,495,287 | 2/1970 | Freimanis | |
| 3,593,730 | 7/1971 | Burchett | |
| 3,904,115 | 9/1975 | Adams | |
| 4,164,325 | 8/1979 | Watson | |
| 4,562,848 | 1/1986 | Messing et al. | |
| 4,677,997 | 7/1987 | Strauss | 239/DIG. 13 X |
| 4,821,961 | 4/1989 | Shook | 239/261 X |
| 5,024,382 | 6/1991 | Shook et al. | 239/251 X |

Primary Examiner—Andres Kashnikow
Assistant Examiner—William Grant
Attorney, Agent, or Firm—Low and Low

[57] ABSTRACT

A hydroactuatable high speed spinner for car wash equipment and the like which is characterized by rugged, reliable design. The spinner is driven soley by water pressure, which may be on the order of 1,000 psi, wherein a unique turbine sleeve ensures high speed operation while still providing adequate pressure for scouring and washing by a relatively lightweight spray rotor carried on the sleeve in a sealed spinner assembly. As a consequence, effective cleaning is achieved with minimum water wastage and maximum conservation.

12 Claims, 1 Drawing Sheet

HIGH SPEED SCOURING HYDROACTUATED SPINNER FOR CAR WASH EQUIPMENT AND THE LIKE

BACKGROUND OF THE INVENTION

In numerous industrial and commercial, as well as in residential environments, means under pressure are utilized for applying and discharging fluid, such as water, for cleaning and like washing applications. Further, to effect good cleaning or scouring of the work, it is desirable to impart motion to the spray fluid as by rotation or other motion of the spray fluid nozzle means so as to impact all available areas of the work, as well as to effect fluid impingement thereagainst at varying angles to assist in dislodging and flusing dirt or other unwanted matter.

To this end, it is generally known to utilize rotary spinning sprayheads for delivering sprays of liquid as water, with or without detergents or additives, onto work to be treated, as in automobile washing operations. Such rotary sprayheads are conventionally spun by one or more electric motors, depending upon the size of the installation and other factors.

It is evident that the use of electric motors to effect rotation of sprayheads and the like is undesirable in water and similar relative electrolyte environments, and therefore requires careful attention and expense in the proper installation and insulation of any electricity source from the water being sprayed from such motor-driven nozzles to minimize hazard to employees and customers. While this can be achieved in a complex and high-tech environment where costs are not critical, such physical precautions in relatively low cost business and retail installations as automobile wash lanes and the like is economically disadvantageous, and wherein further the attending personnel as well as customers may be relatively unskilled, thereby enhancing shock hazard conditions.

In order to reduce the hazard and cost in simpler installations, hydraulic motors have been employed to effect spinning of sprayheads delivering showers of water onto a car or other work. Heretofore, however, hydraulic motors were generally incapable of effecting the high rotational speeds desirable to effect multi-angle and quickly repetitive scouring of the work by one or more rotating spray heads while still providing adequate blast pressure of the water from the spray head nozzles. Conversely, high pressure water has been employed with relatively fixed nozzles for scour cleaning, wherein the water pressure is not also relied upon to drive rotating sprayheads or the like. In all such devices, it is equally important that water be conserved as much as possible while still effecting the cleaning task. Efforts to provide a relatively low cost, rugged, and effective reaction nozzle in this regard have not been successful.

Typical of the known teachings with respect to the foregoing are U.S. Pat. Nos. 3,904,115 to Adams ; 4,562,848 Messing et al; 3,495,287 Freimanis; 3,447,505 Wagner and 3,431,580 Cirino et al, among others.

It is known generally to employ reaction-driven spray nozzles for car wash equipment and the like in prior patents such as U.S. Pat. Nos. 3,409,030 Schmidt or 3,593,730 Burchett. Such equipment however cannot achieve the desired high speed spin of the nozzles coupled with sufficient spray pressure for scouring as required.

BRIEF SUMMARY OF THE INVENTION

The present invention relates to an improved, hydroactuatable spinner characterized by extreme ruggedness, reliability, and which is driven at high speed by water pressure while still being capable of delivering sprays of water with sufficient force to effect thorough cleaning with minimum water wastage.

In actual test usage, the unique turbine driven spinner of the invention has proven very effective, and can effectively utilize high pressure up to on the order of 1,000 psi as well as substantially lower pressure. The use of such high pressures as 500–1000 psi is unique in this art.

The hydroactuatable spinner of the invention is characterized by a unique turbine assembly to impart rotation to the spray rotor. The same constitutes a rugged sleeve, preferably brass, having a circumferential series of slots. The slots themselves are angled to the longitudinal axis of the sleeve and wherein the one sidewall of each slot is angled to an axis radius thereat to define an impact face for the impelling water directed thereagainst from a port or ports on a central stem upon which the sleeve is rotatably mounted. The central stem ports are themselves angled to a stem radius thereat whereby the high pressure water discharged therefrom is directed perpendicularly or nearly so against the angled slot sidewalls.

High pressure water passes through the spinning turbine and into the spray rotor housing from which one, a pair, or more spray nozzles radially extend. The rotor housing is mounted to the turbine sleeve fully surrounding the same to rotate therewith.

Thrust bearings, which may be ball bearings, suitably restrain the turbine sleeve at either end thereof wherein the aforesaid angled slots inherently impel the sleeve axially. In like manner, thrust bearings are provided for the rotor head.

The essential spinner structure of central fluid stem, turbine sleeve, and spray head rotor together provide a rugged construction for long and heavy duty service, and require no electric motor, separate hydraulic motor, or other power apart from the spray fluid itself, usually water. The efficient construction of the spinner permits the spray water to be utilized to drive and rapidly rotate the spray head and thereafter the same water emerges for the high speed spinning rotor to impact, scour and wash a workpiece, such as an automobile in a car wash or the like.

DESCRIPTION OF A PREFERRED EMBODIMENT

Figure 1:
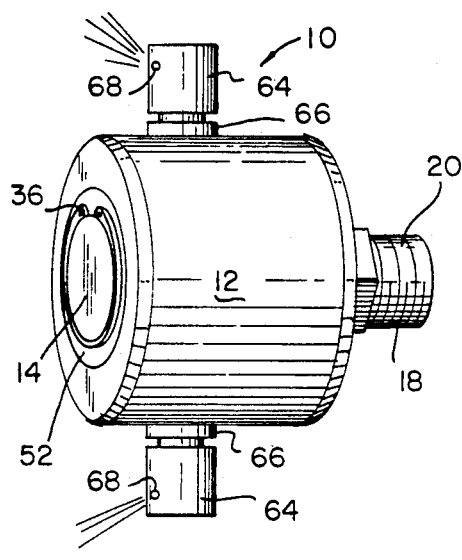
FIG. 1 is a perspective view of the improved hydroactuatable spinner of the invention.

Referring to the drawings, the hydroactuatable spinner of the invention is shown at 10, and essentially comprises an outer rotor 12, a central rigid cylindrical stem 14, and a slotted turbine sleeve 16 is rotatably mounted on stem 14 between it and rotor 12.

An adapter nipple 18 is secured to one end of stem 14 as by a threaded joint, and the outer threaded end 20 thereof is connected to a suitable fixed mount or standard in a washing environment and a supply of high pressure water from a pump or like means (not shown), which may be on the order of 500-1000 psi, is connected to bore 22 of the nipple 18.

Figure 4:
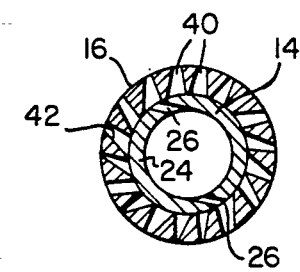
FIG. 4 is a sectional view taken on the lines 4—4 of FIG. 3.

Stem 12 is blind-bored to provide a passage 24 communicating with inlet bore 22 of the nipple, the passage 24 having one or more ports 26, two being shown, extending outwardly therefrom toward turbine sleeve 16. As seen in FIG. 4, the ports 26 extend substantially tangentially from bore 24 to the outer periphery of stem 14 at a substantial angle to the stem longitudinal axis.

The stem 14 is preferably provided with a pair of axially spaced semi-circular grooves 28 on its periphery on either side of ports 26 for reception therein of a conventional elastomeric seal or O-ring 40 and surrounding annular seal 32 of polytetrafluorethylene to minimize fluid leakage axially outwardly of the stem between the stem and sleeve 16. At blind end, stem 14 is provided with an annular groove 34 for reception of a C-clip or like assembly means 36.

Stem 14 is preferably chrome-plated or stainless steel for corrosion protection and to provide a good bearing surface for high speed rotation of turbine sleeve 16 thereon.

Figure 2:
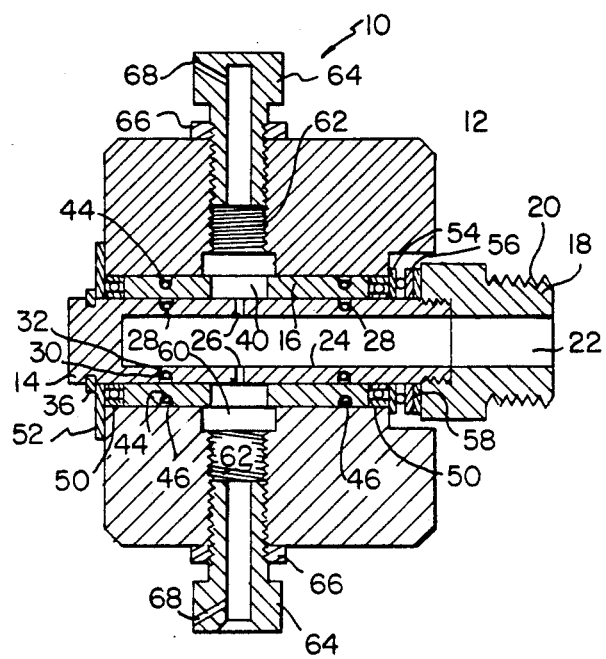
FIG. 2 is a side sectional elevation thereof.
Figure 3:
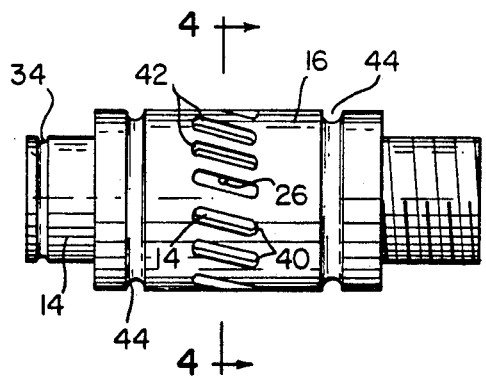
FIG. 3 is a side elevation of the assembled stem and turbine elements alone.

Turbine sleeve 16 is preferably fabricated from brass and includes as seen in FIGS. 2-4 an annular series of slots 40. The slots are cut at angles to a radius from the sleeve longitudinal axis as been seen in FIG. 4, and specifically include a leading sidewall 42 of each slot which is disposed at a substantial angle to the axis and substantially 90 to the axis of stem ports 26 to maximize driving force of water emerging from the ports impacting against the sleeve slot sidewall 42. While nearly a right angle is desirable, an angle of between 75° and 90° will provide adequate impact wall surface to effect the desired high speed spin of the turbine sleeve.

Further it will be seen that the slots 40 are also angled longitudinally with respect to the sleeve axis which will tend to urge the sleeve to the right as seen in FIG. 3 and prevent any chattering of the sleeve on the stem in the event axial play is present.

Sleeve 16 further has a pair of axially spaced grooves 44 similar to stem grooves 28 for respective like reception of an O-ring or like seal 46, thereby preventing leakage between the sleeve 16 and the rotor 12 therearound. The O-rings 46 are tightly pressed between the sleeve 16 and rotor 12 to not only effect a liquid seal but also to enable to rotor and sleeve to revolve as a unit.

As seen in FIG. 2, a bearing annulus 50 is disposed adjacent the left-hand end of sleeve 16 near the closed end of stem 12. The same is disposed against an enlarged washer 52 which in turn bears against the C-clip 36, whereby the washer 50 maintains the parts, including rotor 12, in assembled relation and serves as a thrust bearing at the left-hand end for the parts.

At the other end, a similar bearing annulus 50 bears against a thrust washer 54 similar to washer 52 and which is adjacent an annular series of ball thrust bearings 56, followed by another washer 58, bearing against the end face of adapter nipple 18. It will be recalled that by virtue of the angled turbine slots 40, the sleeve 16 is disposed to urge primarily against the right-hand sides of bearings.

Rotor 12, preferably of aluminum for ease of fabrication and light weight so as to achieve high rotational speed with the turbine and with minimum mass losses to the impelling fluid, is provided with an internal groove 60 surrounding the turbine slots 40. One or more radial passages 62, two being shown, lead radially outwardly therefrom and receive, as by threaded connections which may include lock nuts 66, tubular spray heads 64.

The spray heads are ported to provide spray nozzles 68 which, as shown, may be angled radially outwardly to provide a wider circle of spray discharge for cleaning. Further, the orifice dimensions of the nozzles 68 correspond to those of stem ports 26 to avoid pressure buildup between the stem and nozzle so as to minimize pressure on the seals as well as to maximize rotational velocity and fluid delivery to the car or other object to be scoured and cleaned. The orifices are preferably slightly canted with respect to the longitudinal rotational axis so as to more easily undertake reaction at the commencement of the spray operation and respond promptly to the increasing turbine speed.

The rotor 12 is mounted on the turbine sleeve 16 to rotate therewith as by friction between the pressed O-rings.

With the construction thus described, high pressure water admitted from adapter nipple 18 into stem 14 will pass therefrom tangentially through ports 28 and impact with substantially maximum force transfer against sidewalls 42 of turbine sleeve slots 40, thereby revolving the sleeve and the rotor 12 carried thereby wherein the light weight of the rotor 12 will cause the latter to revolve at high speed as the spray emerges from nozzle orifices 68 against the car being washed.

The utilization of an axially sealed turbine sleeve interposed between the fixed supply stem and the spray rotor to which it is frictionally or mechanically affixed uniquely enables the spinner of the invention to deliver maximum scouring spray against the work as the spinner rotates, with minimum loss of fluid pressure by leakage, with resultant conservation of water.

While I have described a preferred embodiment of my invention, it is to be understood that the same is not limited to the particular forms or shapes disclosed, but embraces variants thereof achieving the same results with the scope of the appended claims defining my invention.

I claim:

1. A high speed hydroactuated spinner for car wash spraying, comprising:
   a stem having a central longitudinal passage therein extending along its axis and having an inlet port,
   a flow port extending between said passage and the outer periphery of said stem, said flow port extending angularly with respect to said axis,
   a sleeve rotatably mounted on said stems, said sleeve having vane ports therethrough angled to a radius and having sidewalls defining vanes, said vane ports being axially aligned with said stem flow port,
   a rotor surrounding said sleeve and having a radial port therein providing a discharge orifice,
   a pair of annular bearings for said sleeve carried by said stem at either end of said sleeve,
   a pair of annular thrust bearings for said rotor at either end of said sleeve bearings and axially outwardly thereof, and,
   seal means between said stem, sleeve, and rotor for confining fluid flow from said inlet port in a path to said discharge orifice, whereby fluid flow through said sleeve vane ports effects rotation of said sleeve and rotor, and a circular spray therefrom through said rotor discharge orifice as said rotor revolves and wherein said fluid flow is both the motive power for said spinner and the applied spray therefrom.

2. The high speed hydroactuated spinner of claim 1 wherein said sleeve has an annular series of said vane ports therearound.

3. The high speed hydroactuated spinner of claim 2 wherein said vane ports include means defining leading water-impact sidewalls disposed at an angle to the longitudinal axis of said flow port.

4. The high speed hydroactuated spinner of claim 3 wherein said angle is on the order of 75°-90° to said flow port.

5. The high speed hydroactuated spinner of claim 2 wherein said vane ports define elongated slots angled to the longitudinal axis of said sleeve.

6. The high speed hydroactuated spinner of claim 1 wherein said rotor has a plurality of discharge orifices arranged symmetrically therabout, thereby to provide a plurality of circular spray sources.

7. The high speed hydroactuated spinner of claim 1 wherein said stem has a plurality of flow ports.

8. The high speed hydroactuated spinner of claim 1 wherein said stem is stainless steel, said sleeve is brass, and said rotor is aluminum for minimum weight and rugged durability of said spinner.

9. A high speed hydroactuated spinner for car wash spraying, comprising:
   a stem having a central longitudinal passage therein extending along its axis and having an inlet port,
   a plurality of flow ports extending between said passage and the outer periphery of said stem, said flow ports extending angularly with respect to said axis,
   a sleeve rotatably mounted on said stem, said sleeve having an annular series of vane ports therearound angled to a radius and having sidewalls defining vanes, said vane ports being axially aligned with said stem flow ports,
   a rotor surrounding said sleeve, said rotor having radial port means therein providing a plurality of discharge orifices arranged symmetrically thereabout thereby to provide a plurality of circular spray orifices,
   a pair of annular bearings for said sleeve carried by said stem at either end of said sleeve,
   a pair of annular thrust bearings for said rotor at either end of said sleeve bearings and axially outwardly thereof, and,
   seal means between said stem, sleeve, and rotor for confining fluid flow from said inlet port in a path to said discharge orifices, whereby fluid flow through said sleeve vane ports effects rotation of said sleeve and rotor, and a circular spray therefrom through said rotor discharge orifices as said rotor revolves and wherein said fluid flow is both the motive power for said spinner and the applied spray therefrom.

10. The high speed hydroactuated spinner of claim 9 wherein said vane ports include means defining leading water-impact sidewalls disposed at an angle to the longitudinal axis of one of said flow ports.

11. The high speed hydroactuated spinner of claim 10 wherein said angle is one the order of 75°-90° to said one flow port.

12. The high speed hydroactuated spinner of claim 9 wherein said vane ports define elongated slots angled to the longitudinal axis of said sleeve.

* * * * *